(12) United States Patent
Rager et al.

(10) Patent No.: US 9,743,642 B2
(45) Date of Patent: Aug. 29, 2017

(54) ANIMAL WATERING APPARATUS

(71) Applicant: Tractor Supply Company, Brentwood, TN (US)

(72) Inventors: Ty Rager, Hendersonville, TN (US); Brian Kennemer, Brentwood, TN (US); Mike Foster, Brentwood, TN (US)

(73) Assignee: Tractor Supply Company, Brentwood, TN (US)

( * ) Notice: Subject to any disclaimer, the term of this patent is extended or adjusted under 35 U.S.C. 154(b) by 338 days.

(21) Appl. No.: 14/636,469

(22) Filed: Mar. 3, 2015

(65) Prior Publication Data
US 2016/0255808 A1 Sep. 8, 2016

(51) Int. Cl.
A01K 7/00 (2006.01)
A01K 7/04 (2006.01)

(52) U.S. Cl.
CPC ...................... *A01K 7/04* (2013.01)

(58) Field of Classification Search
CPC . A01K 7/00; A01K 7/05; A01K 7/022; A01K 7/025; A01K 7/027; A01K 7/04; A01K 7/06
USPC ................ 119/72, 72.5, 74, 78–80
See application file for complete search history.

(56) References Cited

U.S. PATENT DOCUMENTS

| 812,337 | A | | 2/1906 | Gray | |
|---|---|---|---|---|---|
| 1,086,785 | A | * | 2/1914 | Parkins | A01K 7/04 119/78 |
| 1,282,986 | A | * | 10/1918 | Thorson | F16K 31/26 119/80 |
| 1,327,734 | A | * | 1/1920 | Rassmann | A01K 7/04 119/80 |
| 1,577,380 | A | * | 3/1926 | Sonstegard | A01K 7/04 119/79 |

(Continued)

OTHER PUBLICATIONS

Tractor Supply Co.—"Little Giant@ Duramate Hose & Stock Waterer" website printout, 1 page (undated but admitted to be prior art).

(Continued)

*Primary Examiner* — Richard Price, Jr.
(74) *Attorney, Agent, or Firm* — Lucian Wayne Beavers; Patterson Intellectual Property Law, PC

(57) ABSTRACT

An automatic animal watering apparatus includes a dish having an automatic watering valve disposed therein. When the valve is first closed, a water level in the dish is at a maximum level, and a hydraulic source pressure acts only across a smaller cross-sectional area of a valve seat which is closed by the valve, thus requiring only a first lower buoyancy force acting on a valve actuator float to maintain the valve closed. The water level can then drop from the maximum water level to a minimum water level before the hydraulic force action on the valve overcomes the first lower buoyancy force on the actuator float and reopens the valve. Then when the valve opens, the hydraulic source pressure acts against a larger cross-sectional area of the valve, thus requiring the buoyancy forces acting on the float to rise to a second higher buoyancy force to reclose the valve. The automatic watering device may be mounted on an external structure through the use of a mounting bracket, and removable mounting pins may connect the dish, the mounting bracket and a cover plate of the dish.

23 Claims, 11 Drawing Sheets

(56) References Cited

U.S. PATENT DOCUMENTS

| | | | | |
|---|---|---|---|---|
| 1,851,682 | A | * | 3/1932 | Oakes .................. A01K 39/024 |
| | | | | 119/80 |
| 2,614,532 | A | | 10/1952 | Steel |
| 2,739,939 | A | | 3/1956 | Leslie |
| 2,790,417 | A | * | 4/1957 | Brembeck .............. A01K 39/02 |
| | | | | 119/61.2 |
| 3,823,692 | A | * | 7/1974 | Bowser .................... A01K 7/02 |
| | | | | 119/78 |
| 5,255,632 | A | | 10/1993 | Thomas et al. |
| 5,497,731 | A | * | 3/1996 | Schumacher ............ A01K 7/04 |
| | | | | 119/78 |
| 5,782,202 | A | * | 7/1998 | Strickland ................ A01K 7/04 |
| | | | | 119/78 |
| 6,101,976 | A | * | 8/2000 | Gustin ..................... A01K 7/06 |
| | | | | 119/74 |
| 6,142,175 | A | | 11/2000 | Ku |
| 7,481,181 | B2 | * | 1/2009 | Arnerup ................ A01K 7/022 |
| | | | | 119/71 |

OTHER PUBLICATIONS

Tractor Supply Co.—"Little Giant@ Automatic Waterer" website printout, 1 page (undated but admitted to be prior art).

\* cited by examiner

ANIMAL WATERING APPARATUS

BACKGROUND OF THE INVENTION

1. Field of the Invention

The present disclosure relates to automatic watering apparatus for animals such as livestock or dogs. More particularly, the present disclosure relates to a float valve for such a watering apparatus, and to the mounting assembly for such a watering apparatus.

2. Description of the Prior Art

Typical automatic animal watering apparatus in the past have utilized very simple float valves which tend to cycle on and off frequently as the animals drink the water from the watering apparatus. Some animals, particularly livestock such as horses or cattle, tend to be spooked by the operation of such mechanical devices, and thus it would be desirable to have a watering apparatus that allows the animals to drink a relatively large portion of the water in a water dish before the float valve cycles to refill the apparatus.

Additionally, prior art automatic watering apparatus have typically been mounted to a fence post or other external structure by directly bolting the water dish to the structure or by attaching the water dish to the structure by very simple brackets, either of which require hand tools to attach or remove the watering apparatus from the external structure. It would be advantageous to have a mounting system for such watering apparatus that allows attachment and removal of the water dish without the need for use of hand tools.

Thus there is a continuing need for improvements in automatic watering apparatus for animals, including improvements addressed to the problems discussed above.

SUMMARY OF THE INVENTION

In one aspect the present disclosure describes an automatic animal watering device including a dish. A valve is received in the dish and includes a valve body having an inlet conduit. The inlet conduit has an inlet passage therethrough. An outlet conduit of the valve body is open into the interior of the dish. The valve body includes a valve seat defined on an inner end of the inlet passage, and having a seat diameter and a seat cross-sectional area. A valve chamber is defined in the valve body and includes a cylindrical first chamber portion adjacent the valve seat, and a cylindrical second chamber portion on an opposite side of the first chamber portion from the valve seat. The first chamber portion has a first diameter larger than the seat diameter, and the second chamber portion has a second diameter larger than the first diameter. The valve further includes a stepped valve piston slidably received in the valve chamber. The piston includes a smaller diameter piston portion received in the first chamber portion, and a larger diameter piston portion received in the second chamber portion. A valve tip is defined on an end of the smaller diameter piston portion and is arranged to selectively engage the valve seat to open and close the valve. A float arm is pivotally attached to the valve body and arranged to engage an end of the larger diameter piston portion. A float is attached to the float arm.

In another aspect of the invention an automatic animal watering apparatus includes a dish having a bottom, a substantially straight mounting end wall, two sidewalls extending outward from the mounting end wall, and a distal end wall joining the sidewalls. The apparatus includes a divider and cover member removably attached to the dish. The divider and cover member includes a divider wall separating the dish into a first portion adjacent the mounting end wall and a second portion adjacent the distal end wall. The divider wall includes a plurality of water flow openings therethrough. The divider and cover member further includes a cover plate covering the first portion of the dish. The apparatus further includes a float actuated valve received in the first portion of the dish and including an inlet conduit extending through one of the walls of the dish, the valve being held in place within the dish with a fastener attached to the inlet conduit.

Numerous objects features and advantages of the present invention will be readily apparent to those skilled in the art upon a reading of the following disclosure when taken in conjunction with the accompanying drawings.

DETAILED DESCRIPTION

Figure 11:
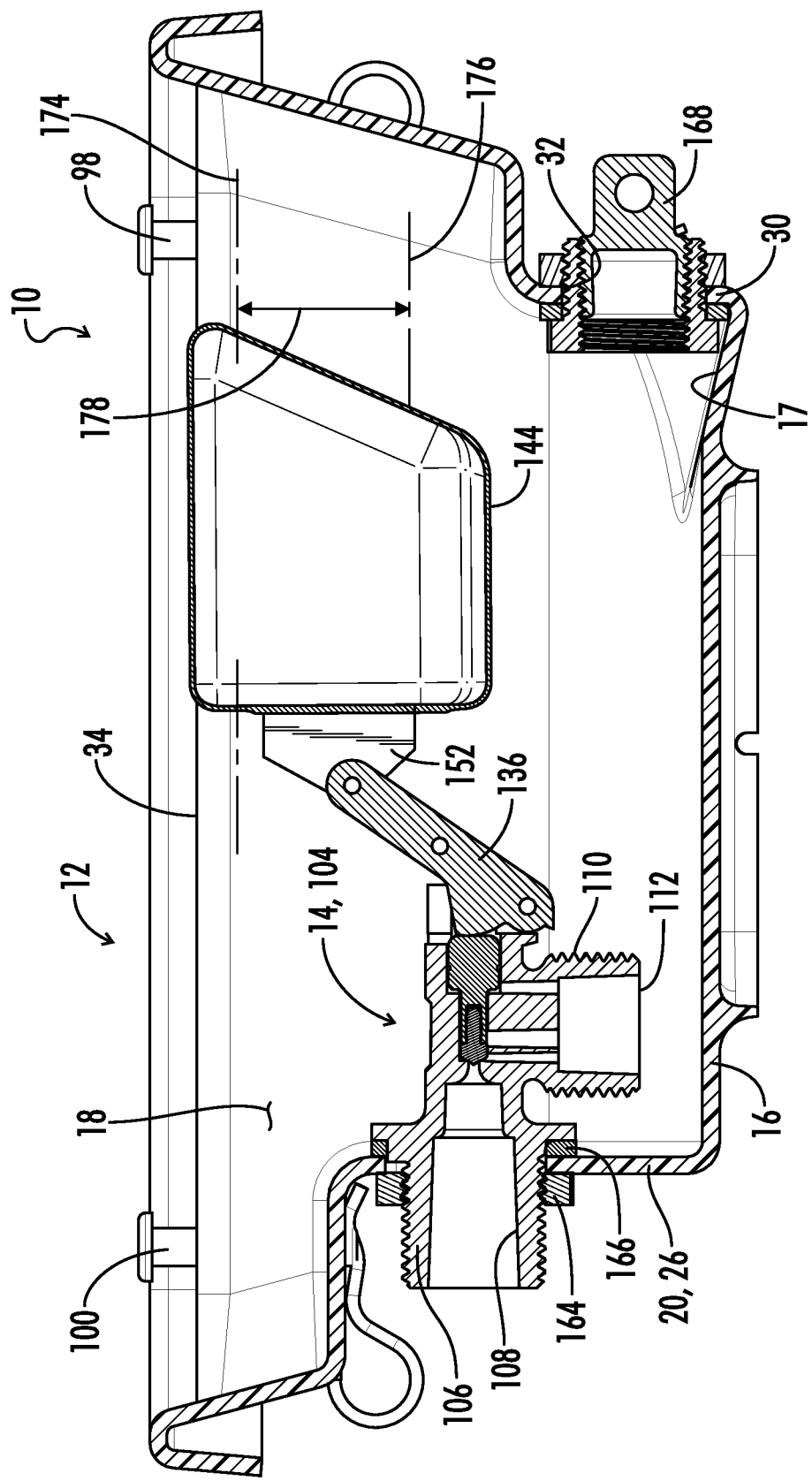
FIG. 11 is a cross-sectional view similar to FIG. 1, showing the valve in place in the water dish.

Referring now to FIG. 11, an automatic animal watering apparatus is shown and generally designated by the numeral 10. The apparatus 10 includes a dish 12 and a valve 14.

Figure 6:
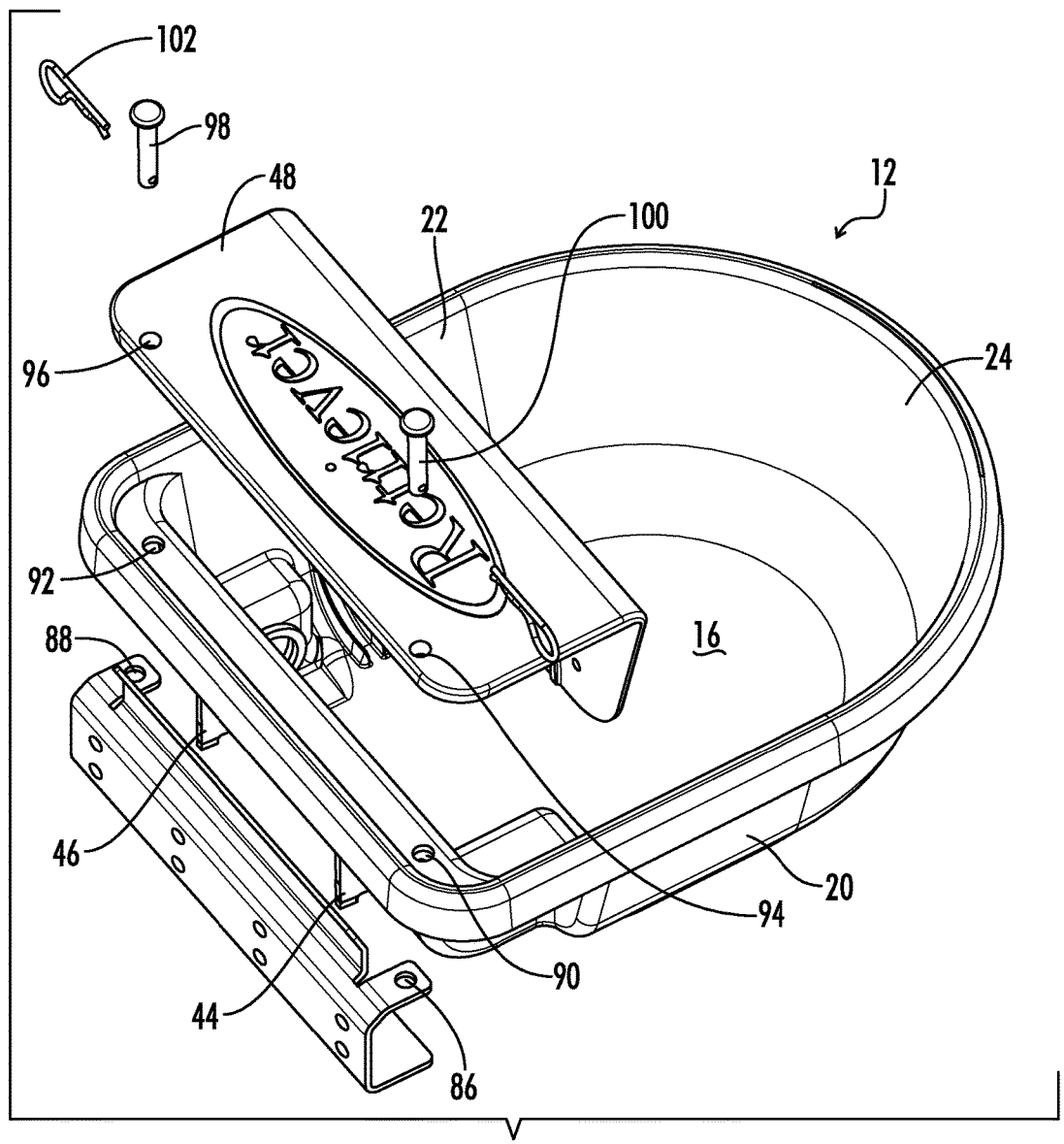
FIG. 6 is a perspective exploded view of a water dish including a divider and cover member, and a mounting channel.
Figure 7:
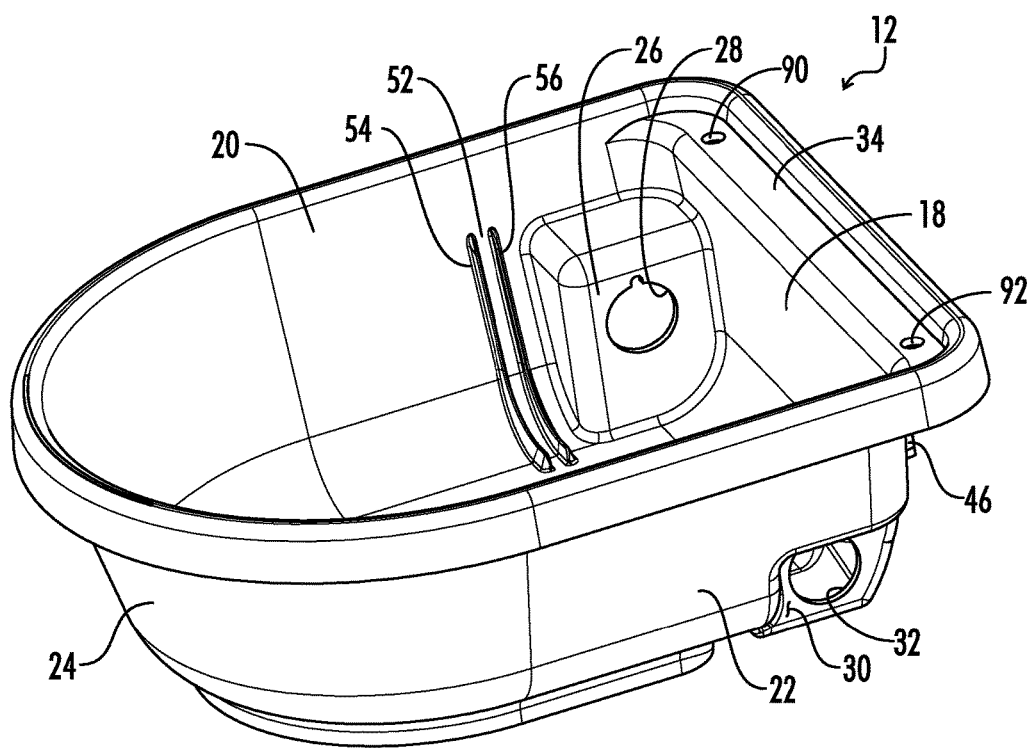
FIG. 7 is another perspective view of the water dish of FIG. 6.
Figure 8:
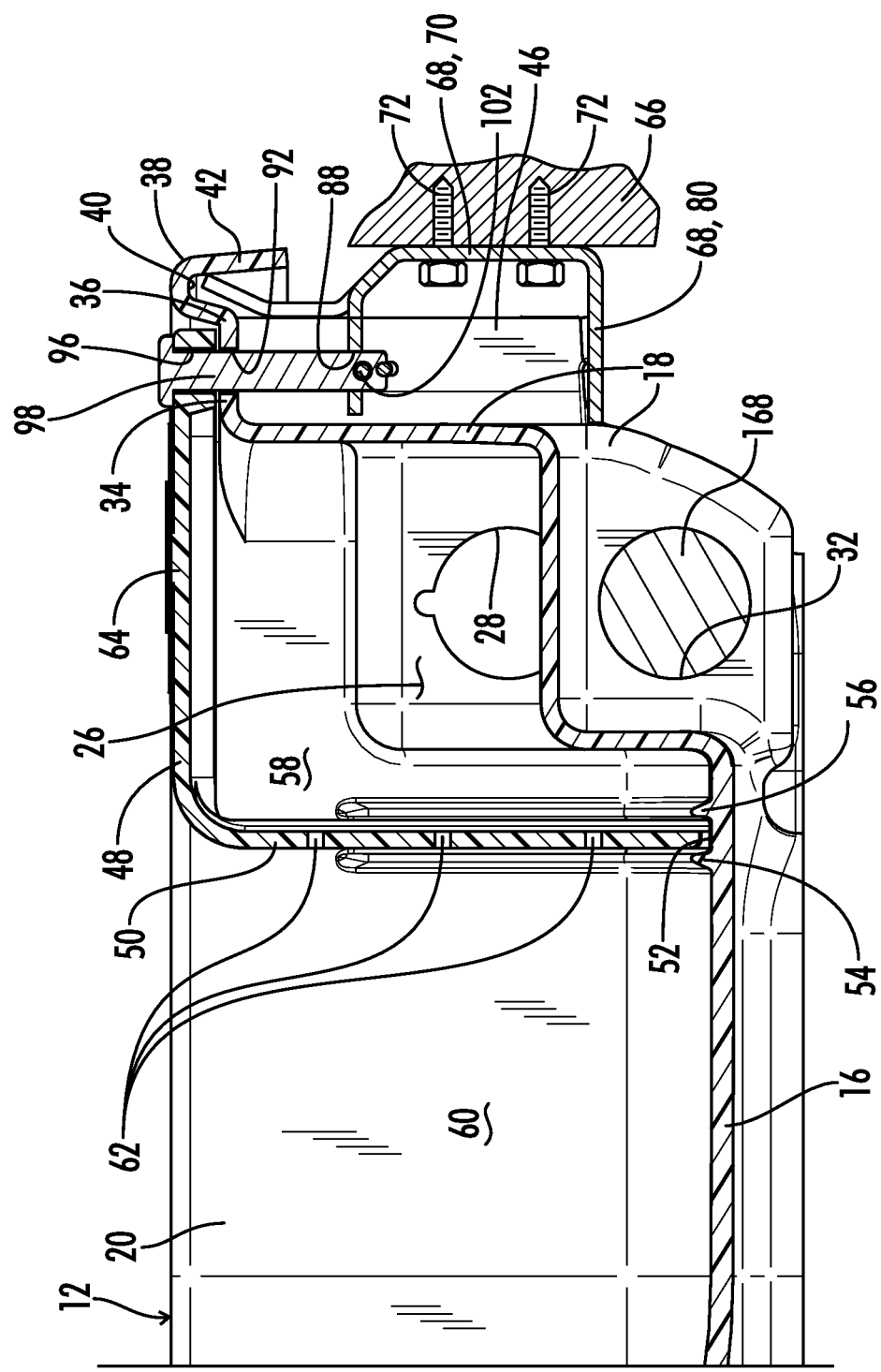
FIG. 8 is an elevation cross-section view showing the water dish assembled with the divider and cover member and the mounting channel.

The dish 12 is best seen in FIGS. 6-8. Dish 12 includes a bottom 16, a substantially straight mounting end wall 18, two substantially straight sidewalls 20 and 22 extending outward from the mounting end wall 18, and a curved distal end wall 24 joining the sidewalls 20 and 22.

At an intersection of the first sidewall 20 with the mounting end wall 18, the first sidewall 20 includes a substantially vertical inset mounting surface 26 having a valve mounting opening 28 therein.

At an intersection of the second sidewall 22 with the mounting end wall 18, the second sidewall 22 includes a second substantially vertical inset mounting surface 30 having a drain opening 32 therein. The drain opening 32 may be closed by a drain plug 168 as seen in FIG. 11. The bottom 16 of dish 12 may also include a depression 17 adjacent drain opening 32 to aid in fully draining the dish 12.

The dish 12 further includes a substantially horizontal mounting flange 34 extending laterally outward from the top of the mounting end wall 18. As best seen in the cross-sectional view of FIG. 8, the horizontal mounting flange 34 is upturned at 36, then downturned at 38 to form a mounting groove 40 and a lip 42 extending downwardly from the mounting groove 40.

The dish 12 further includes first and second vertically extending bracing webs 44 and 46 extending downward from the horizontal mounting flange 34 and rearward from the mounting end wall 18.

Figure 10:
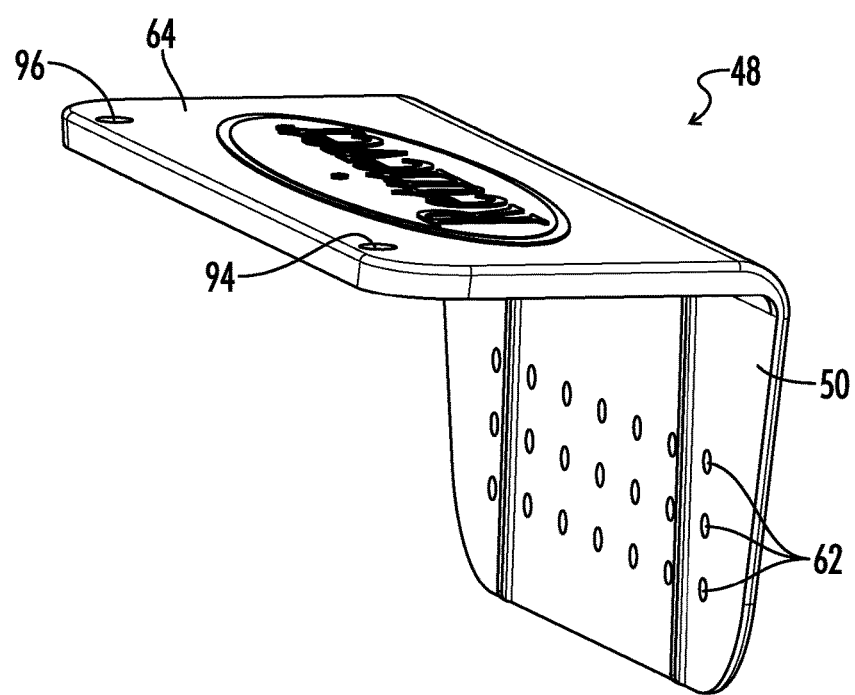
FIG. 10 is a perspective view of the divider and cover member of the apparatus of FIG.

As best seen in FIGS. 6 and 8, the apparatus 10 further includes a divider and cover member 48 removably attached to the dish 12. The divider and cover member 48 includes a substantially vertical divider wall 50 received in a groove 52 defined between ribs 54 and 56 extending inward from the floor and walls of the dish 12. The divider wall 50 separates the dish 12 into a first portion 58 adjacent the mounting end wall 18 and a second portion 60 adjacent the curved distal end wall 24. The divider wall 50 preferably includes a plurality of water flow openings 62 as best seen in FIG. 10.

The divider and cover member 48 further includes a substantially horizontal cover plate 64 which as best seen in FIG. 8 covers the first portion 58 of the dish 12.

Thus the divider wall 50 with its plurality of perforations or water flow openings 62 therethrough serves as a screen between the first portion 58 and second portion 60 of dish 12. This will protect the valve 14 which is located in the first portion 58 from debris which may gather in the second portion 60 of the dish 12 as animals drink from the dish.

As is best seen in FIG. 8, the dish 12 may be mounted on an external structure 66 such as a fence, barn wall, or the like using a mounting channel 68. A perspective view of the mounting channel 68 is shown in FIG. 9.

Figure 9:
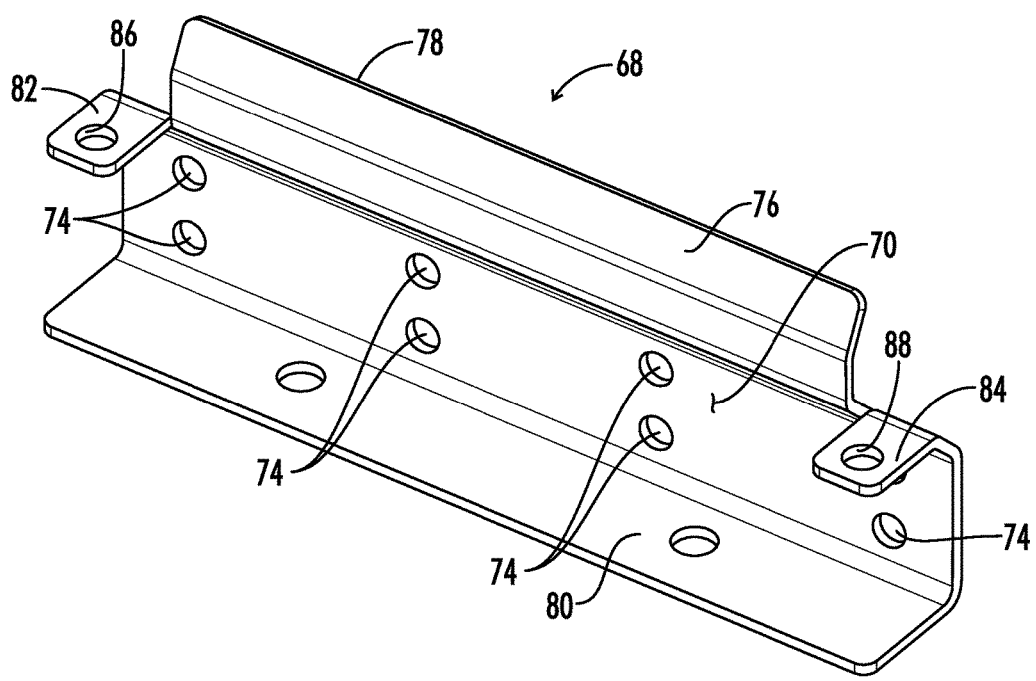
FIG. 9 is an enlarged perspective view of the mounting channel of FIGS. 6 and 8.

As best seen in FIGS. 8 and 9, the mounting channel 68 includes a vertical web 70 configured for attachment to the external structure 66 such as by mounting screws 72 extending through attachment openings 74 in the vertical web 70, and into the external structure 66 as shown in FIG. 8.

Mounting channel 68 further includes an integral upward protruding mounting lip 76 formed out of the channel 68 and having an upper edge 78 received in the mounting groove 40 as best seen in FIG. 8.

Mounting channel 68 includes a horizontally extending lower web 80 engaging the mounting end wall 18 of dish 12 as seen in FIG. 8, with the vertically extending bracing webs 44 and 46 of dish 12 being supported on top of the lower web 80 of mounting channel 68, as also shown in FIG. 8.

The mounting channel 68 further includes first and second substantially horizontal tabs 82 and 84 adjacent first and second ends of the vertical web 70. The tabs 82 and 84 extend from the vertical web 70 toward the mounting end wall 18 of dish 12.

The tabs 82 and 84 have tab pin holes 86 and 88 defined therein, respectively. The horizontal mounting flange 34 of dish 12 has mounting flange pin holes 90 and 92 defined therein. The cover plate 64 has cover plate pin holes 94 and 96 defined therein.

As best seen in FIG. 8, when the dish 12, divider and cover member 48, and mounting channel 68 are assembled together, tab pin hole 88 is aligned with mounting flange pin hole 92 and cover plate pin hole 96 and a mounting pin 98 extends downwardly through the aligned pin holes. Similarly, another mounting pin 100 (see FIG. 6) extends downward through aligned pin holes 94, 90 and 86. The pins 98 and 100 may be held in place after insertion via a keeper such as 102.

Thus, the mounting pins 98 and 100, as received in the assembled dish 12, divider and cover member 48, and mounting channel 68 allow the dish 12 to be easily mounted on the mounting channel 68 or removed from the mounting channel 68 without the use of any tools.

The Valve Structure

Referring now to FIGS. 1-5 and 11, the details of construction of the valve 14 will be described.

The valve 14 includes a valve body 104. As seen in the cross-section view of FIG. 11, the valve body 104 includes an externally threaded inlet conduit 106 extending through the sidewall 20, and particularly through the inset mounting surface 26 of sidewall 20. The inlet conduit 106 has an inlet passage 108 defined therethrough.

Valve body 104 further includes an outlet conduit 110 having an open end 112 opened into the interior of the dish 12, and particularly into the first dish portion 58 of the interior of dish 12. A series of vertical passages 113a, 113b and 113c communicate the valve chamber 118 with the open end 112 of outlet conduit 110. Each of the passages 113a, 113b and 113c may be generally circular in horizontal cross-section. Passages 113a and 113b provide for increased flow area as the piston 128 moves from the closed position of FIG. 1 toward the open position of FIG. 3. Passage 113c prevents hydraulic blocking of the piston 128.

Figure 3:
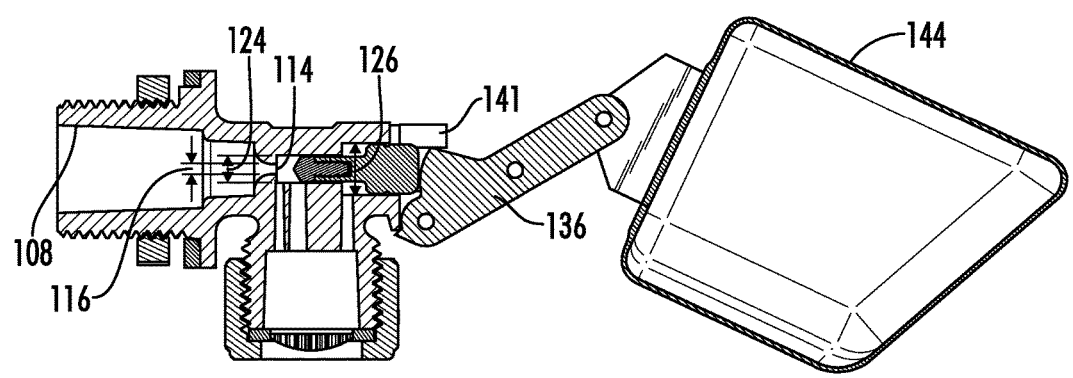
FIG. 3 is a view similar to FIG. 1 in which the float, float arm and valve are in their fully opened position, wherein the watering apparatus is now refilling at full flow.

A circular valve seat 114 is defined on an inner end of the inlet passage 108 as best seen in FIG. 3. The valve seat 114 has a seat diameter 116 thus defining a cross-sectional area of the valve seat 114 equal to the seat diameter 116 squared, times pi, divided by four.

The valve body 104 has a valve chamber 118 defined therein including a cylindrical first chamber portion 120 adjacent the valve seat 114 and including a cylindrical second chamber portion 122 on an opposite side of the first chamber portion 120 from the valve seat 114. The first chamber portion has a first diameter 124 larger than the seat diameter 116, and the second chamber portion 122 has a second diameter 126 larger than the first diameter 124.

The valve 14 includes a stepped valve piston 128 slidably received in the valve chamber 118. The piston 128 includes a smaller diameter piston portion 130 received in the first chamber portion 120, and a larger diameter piston portion 132 received in the second chamber portion 122.

A valve tip 134 is defined on an end of the smaller diameter piston portion 130 and arranged to selectively engage the valve seat 114 to open and close the valve 14.

Figure 4:
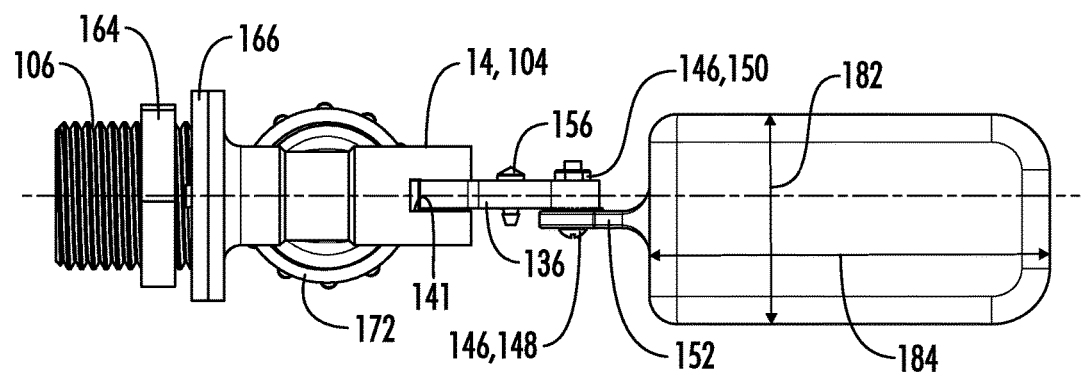
FIG. 4 is a plan view of the valve and float arm structure of the apparatus of FIG. 1.
Figure 5:
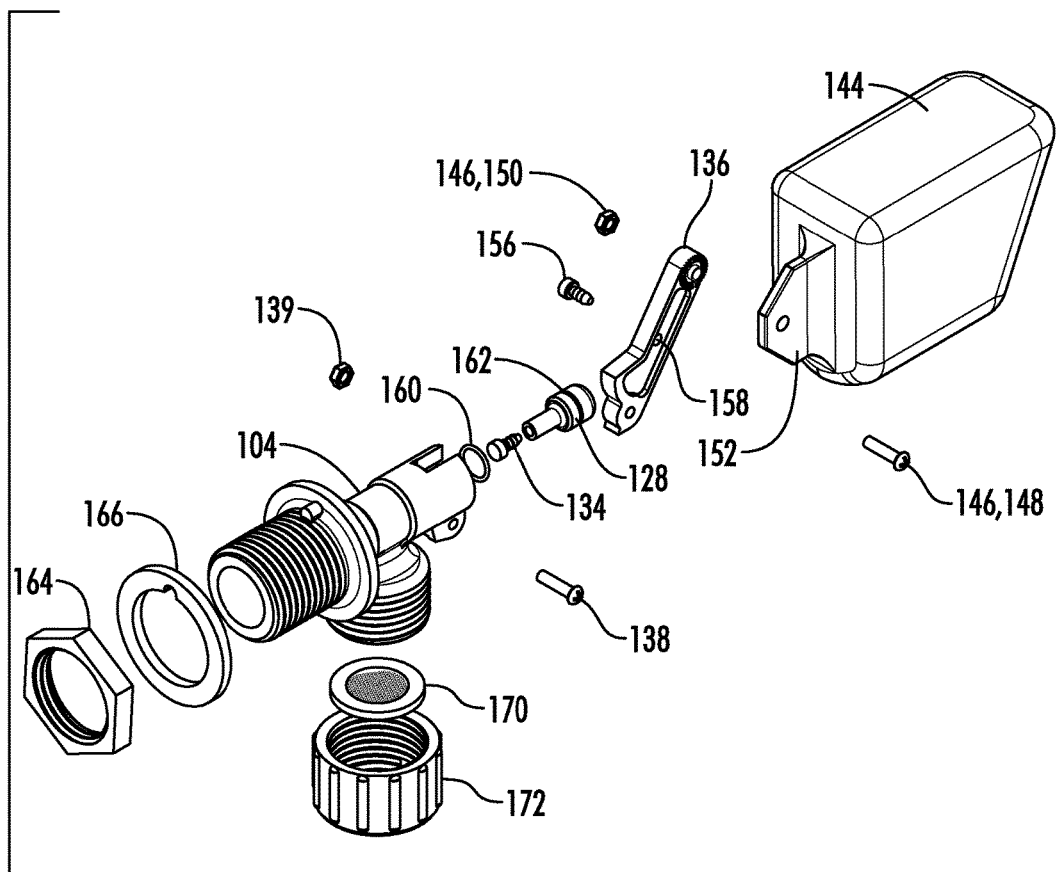
FIG. 5 is a perspective exploded view of the valve and float apparatus of FIG. 1.

A float arm 136 is pivotally attached to the valve body 104 by pivot pin 138. Pivot pin 138 may be held in place by nut 139. Float arm 136 includes a lateral protrusion 140 having a curved abutment surface 142 which engages an end of the larger diameter piston portion 132 of valve piston 128. As best seen in FIG. 4, the protrusion 140 is received in a slot 141 defined in the end of the valve body 104.

A float 144 is attached to the float arm 136 by adjustable pivotal connection 146. The adjustable pivotal connection 146 may include a bolt 148 and a nut 150 which can be used to tightly connect a mounting tab 152 of float 144 to the float arm 136.

Figure 2:
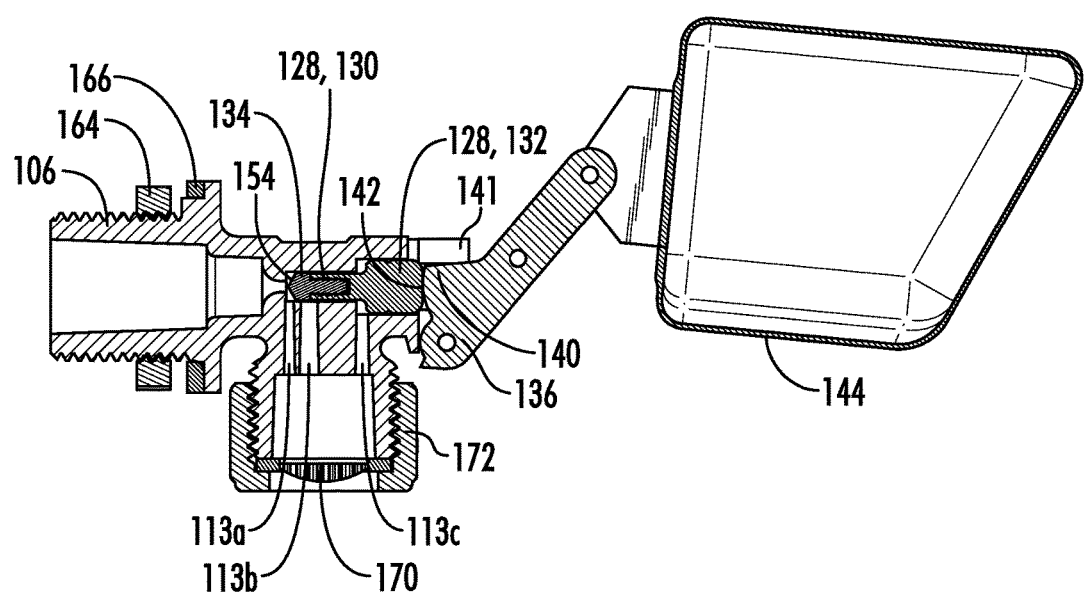
FIG. 2 is a view similar to FIG. 1 in which the float and float arm are in an intermediate position, and the valve is in a partially opened position, and the watering apparatus is starting to refill with partial flow.

As seen for example in FIG. 2, the valve tip 134 may include a conically tapered tip end 154 configured to sealingly engage the valve seat 114. The valve tip 134 is preferably comprises a separable valve tip 134 attached to the end of the smaller diameter piston portion, and the valve tip 134 is preferably formed of an elastomeric material such as rubber. A spare valve tip 156 may be stored on the float arm 136 by placing the same in a close friction fit engagement through storage hole 158 defined in float arm 136.

An O-ring seal 160 is preferably received around the larger diameter piston portion 132 in a groove 162. The O-ring seal 160 is then closely received in the cylindrical second chamber portion 122 of the valve chamber 118 for sealing between the valve piston 128 and the second chamber portion 122.

The inlet conduit 106 of valve body 104 is a threaded conduit as seen in FIG. 11, and a threaded nut 164 is received thereon outside of the sidewall 20 and holds the valve 14 securely in place on the sidewall 20 of the dish 12. A valve washer 166 preferably made of a resilient sealing material may be received about the inlet conduit 116 and seal against an inner surface of inset mounting surface 26 to prevent leakage of water from the dish 12 through the opening 28.

Thus, the valve 14 will be mounted through the opening 28 in the inset mounting surface 26 of first sidewall 20, and the plug 168 will be provided in the drain hole 32 on the opposite sidewall 22 of dish 12.

The outlet conduit 110 has an outlet screen 170 attached to and covering the outlet end 112. The outlet screen 170 is held in place by a threaded retainer collar 172.

The outlet screen 170 and the plurality of perforations 62 through the divider wall 50 provide a dual screen system between the second portion 60 of dish 12 and the valve chamber 118 of the valve 14, thus protecting the internal working parts of valve 14 from debris which may accumulate in the second portion 60 of dish 12.

Figure 1:
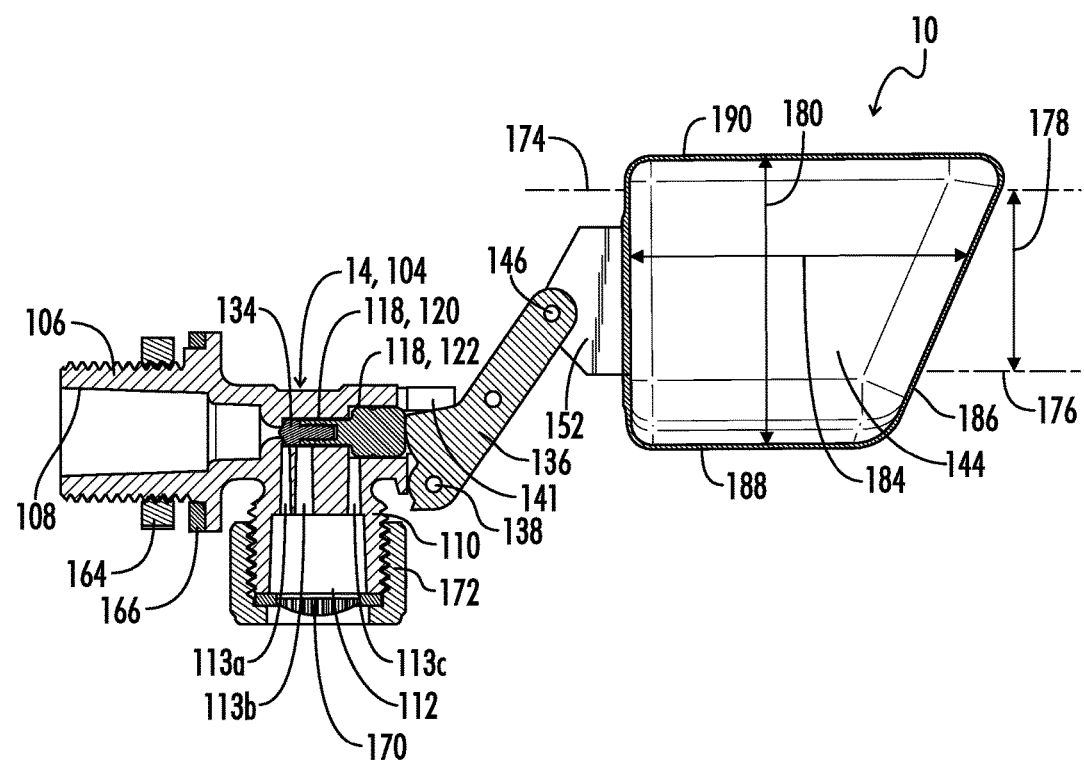
FIG. 1 is an elevation cross-section view of an automatic watering apparatus, including a float actuated valve, showing the valve in the fully closed position.

FIG. 1 illustrates the valve 14 in a fully closed position wherein the valve piston 118 is in its closed position with the tip end 154 of valve tip 134 engaging the valve seat 114. In this closed position the hydraulic force from available water source pressure which is connected to the inlet passage 108 acts across the valve seat area defined by valve seat diameter 116.

When the water dish 12 has just completed refilling and the float 144 has moved the valve piston 118 back to the closed position illustrated in FIG. 1, the dish 12 is filled with water to a maximum level schematically illustrated as 174 in FIGS. 1 and 11. The design of the valve 14, and the valve float 144 are such that as water is withdrawn from the dish 12 by animals drinking the same, the water level will fall from the max level 174 to a minimum level schematically illustrated as 176 before the hydraulic force acting across the small valve seat area defined by valve seat diameter 116 overcomes the buoyancy force acting on float 144 so as to start to move the valve piston 128, float arm 136 and float 144 to the right so that the valve tip 134 moves out of engagement with the valve seat 114.

As soon as the valve tip 134 moves out of engagement with the valve seat 114, the valve float 144 and float arm 136 will substantially immediately drop from the fully closed position of FIG. 1, through the partially open position of FIG. 2, to the fully open position of FIG. 3. This is because, as soon as the valve tip 134 moves out of engagement with the valve seat 114, the hydraulic pressure in inlet passage 108 is then acting across the much larger cross-sectional area of the first chamber portion 120 defined by the much larger diameter 124 of first chamber portion 120. Thus, as soon as the valve 14 begins to open, the hydraulic force pushing against the valve piston 128 abruptly increases thus causing the valve piston 128 to rapidly move from left to right as seen in FIGS. 1-3, thus pivoting the float arm 136 rapidly clockwise and dropping the float 144 to its fully open position as shown in FIG. 3.

After the valve 14 moves to the fully open position of FIG. 3, wherein the water level is initially at the minimum level 176, the water level will begin to rise. When the water level rises sufficiently that the buoyance force acting on float 144 overcomes the hydraulic force acting on the smaller diameter piston portion 130, and any inertial and friction forces, the float 144 will begin to rise and to push the piston 128 back toward its closed position. Once the float 144 begins to rise, it very quickly moves back to the fully closed position of FIG. 1. It will be understood that when the valve 14 is in its fully open position of FIG. 3 the actual hydraulic pressure acting against smaller diameter piston portion 130 will not be fully equal to the hydraulic source pressure being provided to inlet passage 108 because some of that pressure is being relieved via outlet 112. The closer the piston 128 moves back toward the valve seat 114 the higher that effective pressure will be and the higher the hydraulic force will be, until the hydraulic force approaches a value of the diameter 124 squared times pi divided by 4 just before the valve closes. Thus the hydraulic force which must be overcome to re-close the valve 14 corresponds to the available water source pressure multiplied times the cross-sectional area of the first cylindrical chamber portion 120, although it may not be exactly equal to that value.

Thus the valve 14 may be described as a two-stage valve based upon the two different cross-sectional areas of valve seat 114 and first cylindrical chamber portion 120. Once the valve is closed a relatively small buoyancy force on float 144 will keep the valve closed, and the water level in the dish must drop significantly to the minimum level 176 before the float 144 will drop and the valve 14 opens. Then the water level must rise to the maximum level 174 before the buoyancy force is high enough to re-close the valve 14.

The vertical distance 178 between the maximum level 174 and minimum level 176 within the dish 12 is preferably within a range of about 0.5 to about 1.5 inch, and is more preferably about 1.0 inch. This range can also be described as at least about 0.5 inch.

As can be seen in FIGS. 1 and 4, the valve float 144 has a vertical height 180, a width 182, and a variable length 184. As seen in FIG. 1, the length 184 varies because an outer end wall 186 of float 144 slopes outwardly from a bottom 188 to a top 190 of the float 144.

Thus the valve float 144 can be described as having its vertical height 180 greater than at least one of the cross-sectional dimensions 182 and 184 of the float 144. The float 144 can be described as having a smallest cross-sectional area equal to the product of its width 182 and variable length 184 adjacent the bottom 188 of the float 144. The float 144 can be described as having a largest cross-sectional area adjacent the top 190 of the float 144. The cross-sectional area of the float 144 can be described as increasing continuously upwardly from the bottom 188 of the float 144 over at least a lower portion of the float 144.

This construction of the valve float 144 being relatively tall with the height 180 greater than at least one of the cross-sectional dimensions 182 and 184 contributes to the desired performance of the valve 14 and to achieving the desired relatively large drop 178 in water level before the valve 14 opens to begin re-filling.

Thus it is seen that the apparatus of the present invention readily achieves the ends and advantages mentioned as well as those inherent therein. While certain preferred embodiments of the invention have been illustrated and described for purposes of the present disclosure, numerous changes in the arrangement and construction of parts may be made by those skilled in the art, which changes are encompassed within the scope and spirit of the present invention as defined by the appended claims.

What is claimed is:

1. An automatic animal watering apparatus, comprising:
a dish; and
a valve received in the dish, the valve including:
   a valve body, the valve body including;
      an inlet conduit having an inlet passage therethrough;
      an outlet conduit open into the interior of the dish;
      a valve seat defined on an inner end of the inlet passage, having a seat diameter and a seat cross-sectional area;
      a valve chamber defined in the valve body and including a cylindrical first chamber portion adjacent the valve seat, and a cylindrical second chamber portion on an opposite side of the first chamber portion from the valve seat, the first chamber portion having a first diameter larger than the seat diameter, the second chamber portion having a second diameter larger than the first diameter;
   a stepped valve piston slidably received in the valve chamber, the piston including a smaller diameter piston portion received in the first chamber portion, and the piston including a larger diameter piston portion received in the second chamber portion;
   a valve tip defined on an end of the smaller diameter piston portion and arranged to selectively engage the valve seat to open and close the valve;
   a float arm pivotally attached to the valve body and arranged to engage an end of the larger diameter piston portion; and
   a float attached to the float arm.

2. The apparatus of claim 1, wherein:
the valve piston has a closed position wherein the valve tip engages the valve seat, and wherein a first hydraulic force available to re-open the valve corresponds to an available water source pressure multiplied times the seat cross-sectional area.

3. The apparatus of claim 2, wherein:
the valve piston has an open position wherein the valve tip is out of engagement with the valve seat, and a second hydraulic force which must be overcome to re-close the valve is greater than the first hydraulic force.

4. The apparatus of claim 3, wherein:
when the water dish has just completed refilling and the float has moved the valve piston back to the closed position, the dish is filled with water to a maximum level;
when the water level in the dish falls to a minimum level, the valve opens and begins to refill; and
a vertical distance between the maximum level and the minimum level is at least 0.5 inch.

5. The apparatus of claim 3, wherein:
the valve float has a vertical height greater than at least one cross-sectional dimension of the float, and the float has a smallest cross-sectional area adjacent a bottom of the float and a largest cross-sectional area adjacent a top of the float, and the cross-sectional area of the float increases continuously upwardly from the bottom of the float over at least a lower portion of the float.

6. The apparatus of claim 3, wherein:
the second hydraulic force which must be overcome to re-close the valve corresponds to an available water source pressure multiplied times a cross-sectional area of the cylindrical first chamber portion.

7. The apparatus of claim 1, wherein:
the valve tip includes a conically tapered tip end configured to sealingly engage the valve seat.

8. The apparatus of claim 1, wherein:
the valve tip comprises a separable valve tip attached to the end of the smaller diameter piston portion, and the valve tip is formed of an elastomeric material.

9. The apparatus of claim 1, further comprising:
a spare valve tip stored on the float arm.

10. The apparatus of claim 1, further comprising:
a divider and cover member having an L-shape cross-section including a substantially vertical divider wall separating the dish into first and second dish portions, and a substantially horizontal cover plate covering the first dish portion, the valve being located in the first dish portion; and
the vertical divider wall including a plurality of perforations so as to allow water to flow through the divider wall, and so as to screen the valve in the first dish portion from debris in the second dish portion.

11. The apparatus of claim 10, further comprising:
an outlet screen attached to and covering an outlet end of the outlet conduit, so that a dual screen system is provided between the valve chamber and the second dish portion.

12. The apparatus of claim 1, further comprising:
an o-ring seal received around the larger diameter piston portion of the valve piston, the o-ring seal being closely received in the cylindrical second chamber portion of the valve chamber for sealing between the valve piston and the cylindrical second chamber portion.

13. The apparatus of claim 1, wherein:
the dish includes a dish sidewall; and
the inlet conduit of the valve body extends through the sidewall of the dish.

14. An automatic animal watering apparatus, comprising:
a dish including a bottom, a substantially straight mounting end wall, two sidewalls extending outward from the mounting end wall, and a distal end wall joining the sidewalls;
a divider and cover member removably attached to the dish, and including:
   a divider wall separating the dish into a first portion adjacent the mounting end wall and a second portion adjacent the distal end wall, the divider wall including a plurality of water flow openings therethrough; and
   a cover plate covering the first portion of the dish; and
a float actuated valve received in the first portion of the dish and including an inlet conduit extending through one of the walls of the dish, the valve being held fixed in place within the dish with fastener attached to the inlet conduit.

15. The apparatus of claim 14, wherein:
at an intersection of one of the sidewalls with the mounting end wall, the one of the sidewalls includes a substantially vertical inset mounting surface having an opening therein; and
the inlet conduit of the valve extends through the opening in the inset mounting surface.

16. The apparatus of claim 15, wherein:
one of the substantially vertical inset mounting surfaces is present at the intersection of each of the sidewalls with the mounting end wall, and each of the inset mounting surfaces has an opening therein.

17. The apparatus of claim 16, further comprising:
a plug closing the opening of the inset mounting surface on an opposite side of the dish from the valve.

18. The apparatus of claim 14, wherein:

the dish further includes:
- a substantially horizontal mounting flange extending laterally outward from a top of the mounting end wall, then upturned and downturned to form a mounting groove and a lip extending downwardly from the mounting groove; and
- first and second vertically extending bracing webs extending downward from the mounting flange and outward from the mounting end wall.

19. The apparatus of claim 18, further comprising:

a mounting channel open toward the mounting end wall of the dish, the mounting channel including:
- a vertical web configured for attachment to an external structure;
- an upward extending mounting edge extending upward from the vertical web and received in the mounting groove; and
- a horizontally extending lower web having an edge engaging the mounting end wall of the dish with the vertically extending bracing webs of the dish being supported on top of the lower web of the mounting channel.

20. The apparatus of claim 19, wherein:

the mounting channel further includes first and second substantially horizontal tabs adjacent first and second ends of the vertical web, the tabs extending from the vertical web toward the mounting end wall of the dish; the tabs, the horizontal mounting flange of the dish, and the cover plate all have defined therein aligned pin holes; and the apparatus further comprises first and second mounting pins extending downwardly through the aligned pin holes of the cover plate, the horizontal mounting flange of the dish, and then the first and second tabs, respectively, such that the mounting pins hold the dish and the cover plate attached to the mounting channel.

21. The apparatus of claim 14, further comprising:

a mounting bracket configured to be attached to an external structure; and first and second removable mounting pins extending downward through first and second sets of aligned pin holes through first the cover plate, then the dish and then the mounting bracket, to releasably connect the dish and the cover plate to the mounting bracket.

22. The apparatus of claim 14, wherein:

the divider wall is substantially vertically oriented; and the cover plate is substantially horizontally oriented.

23. The apparatus of claim 14, wherein:

the inlet conduit is an externally threaded inlet conduit; and the fastener includes a threaded nut attached to the threaded inlet conduit outside of the dish.

* * * * *